(12) United States Patent
Pyo et al.

(10) Patent No.: US 10,810,934 B2
(45) Date of Patent: Oct. 20, 2020

(54) DISPLAY DEVICE AND METHOD OF DRIVING THE SAME

(71) Applicant: SAMSUNG DISPLAY CO, LTD., Yongin-si, Gyeonggi-do (KR)

(72) Inventors: Si-Beak Pyo, Asan-si (KR); Yoongyu Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 60 days.

(21) Appl. No.: 16/285,929

(22) Filed: Feb. 26, 2019

(65) Prior Publication Data
US 2019/0266941 A1    Aug. 29, 2019

(30) Foreign Application Priority Data
Feb. 28, 2018 (KR) .................. 10-2018-0024564

(51) Int. Cl.
*G06T 7/90* (2017.01)
*G09G 3/3225* (2016.01)

(52) U.S. Cl.
CPC ............. *G09G 3/3225* (2013.01); *G06T 7/90* (2017.01); *G06T 2207/10024* (2013.01); *G06T 2207/20072* (2013.01); *G09G 2320/029* (2013.01); *G09G 2320/0238* (2013.01)

(58) Field of Classification Search
None
See application file for complete search history.

(56) References Cited

U.S. PATENT DOCUMENTS

| 9,013,519 | B2 | 4/2015 | Park et al. |
| 9,208,718 | B2 | 12/2015 | Pyo |
| 9,460,657 | B2 | 10/2016 | Pyo |
| 9,514,709 | B2 | 12/2016 | Pyo |
| 9,542,887 | B2 | 1/2017 | Pyo |
| 9,742,596 | B2* | 8/2017 | Goyal ............... H04L 25/03057 |
| 9,892,682 | B2 | 2/2018 | Pyo |

(Continued)

FOREIGN PATENT DOCUMENTS

| EP | 3252749 | 2/2018 |
| JP | 2017083813 | 5/2017 |

(Continued)

*Primary Examiner* — Parul H Gupta
(74) *Attorney, Agent, or Firm* — F. Chau & Associates, LLC

(57) ABSTRACT

A display device includes a display panel including pixels each including a light emitting element and a bypass transistor connected to the light emitting element to receive an initialization voltage, a first offset voltage determining unit determining a first offset voltage using a brightness period of image data and a temperature of the display panel, a black image detecting unit detecting black data among the image data to determine a dense area of the pixels to which the black data are applied, and determining whether to proceed with a subsequent operation, an image analyzing unit analyzing the image data depending on the determination of whether to proceed with the subsequent operation, and outputting an analyzed result, and a second offset voltage determining unit determining a second offset voltage using the analyzed result. The initialization voltage is determined using the first offset voltage and the second offset voltage.

20 Claims, 6 Drawing Sheets

(56) References Cited

U.S. PATENT DOCUMENTS

| | | | |
|---|---|---|---|
| 2011/0157133 A1* | 6/2011 | Ogura | G09G 3/3291 345/211 |
| 2013/0015770 A1* | 1/2013 | Aitken | G09G 3/3406 315/154 |
| 2017/0124958 A1 | 5/2017 | Pyo et al. | |
| 2017/0294156 A1 | 10/2017 | Pyo et al. | |
| 2017/0365218 A1 | 12/2017 | Jeong et al. | |
| 2018/0182354 A1* | 6/2018 | Radhakrishnan | G09G 3/2018 |
| 2019/0080648 A1 | 3/2019 | Hwang et al. | |
| 2019/0130825 A1 | 5/2019 | Pyo et al. | |

FOREIGN PATENT DOCUMENTS

| | | |
|---|---|---|
| KR | 1020140073322 | 6/2014 |
| KR | 1020150072593 | 6/2015 |
| KR | 1020160148128 | 12/2016 |
| KR | 1020170143049 | 12/2017 |
| KR | 10-2019-0029833 | 3/2019 |
| KR | 10-2019-0049979 | 5/2019 |

\* cited by examiner

DISPLAY DEVICE AND METHOD OF DRIVING THE SAME

CROSS-REFERENCE TO RELATED APPLICATION

This U.S. non-provisional patent application claims priority under 35 U.S.C. § 119 to Korean Patent Application No. 10-2018-0024564, filed on Feb. 28, 2018 in the Korean Intellectual Property Office, the disclosure of which is incorporated by reference herein in its entirety.

TECHNICAL FIELD

Exemplary embodiments of the inventive concept relate to a display device having improved display characteristics and a method of driving the display device.

DISCUSSION OF RELATED ART

An organic light emitting display device includes a light emitting diode, and the light emitting diode emits a light through recombination of electrons and holes. The organic light emitting display device has advantages, such as a fast response speed, low power consumption, etc. However, when a current is not sufficiently supplied to the light emitting diode, a frame response speed of a first frame becomes slow. In addition, when the light emitting diode emits the light by leakage current, a phenomenon occurs in which a pixel emits the light in a black image. As a result, deterioration in display quality such as color change occurs.

SUMMARY

According to an exemplary embodiment of the inventive concept, a display device includes a display panel including pixels each including a light emitting element and a bypass transistor connected to the light emitting element to receive an initialization voltage, a first offset voltage determining unit determining a first offset voltage using a brightness period of image data and a temperature of the display panel, a black image detecting unit detecting black data among the image data to determine a dense area of the pixels to which the black data are applied and determining whether to proceed with a subsequent operation that analyzes the image data, an image analyzing unit analyzing the image data depending on the determination of whether to proceed with the subsequent operation and outputting an analyzed result, and a second offset voltage determining unit determining a second offset voltage using the analyzed result of the image analyzing unit. The initialization voltage is determined using the first offset voltage and the second offset voltage.

The image analyzing unit is an image histogram analyzing unit that analyzes an image histogram for each grayscale of the image data, and the image histogram analyzing unit outputs a histogram analysis result of the image data to the second offset voltage determining unit.

The second offset voltage determining unit determines an image type of the image data using the histogram analysis result and determines the second offset voltage using the image type.

The image data include one or more color components, the second offset voltage determining unit determines the second offset voltage using the one or more color components, the image type includes a first image type and a second image type, the image data having the second image type has more green color components than the image data having the first image type, and a level of the second offset voltage when the image type is the second image type is higher than a level of the second offset voltage when the image type is the first image type.

The image type includes a first image type and a second image type, a low grayscale data frequency of the first image type is higher than a low grayscale data frequency of the second image type, and a level of the second offset voltage when the image type is the first image type is higher than a level of the second offset voltage when the image type is the second image type.

The image analyzing unit is an average on-pixel ratio determining unit that determines an average on-pixel ratio of the image data, and the average on-pixel ratio determining unit outputs a signal including average on-pixel ratio information of the image data to the second offset voltage determining unit.

The second offset voltage determining unit determines which section among plural on-pixel ratio sections the average on-pixel ratio information belongs to and determines the second offset voltage depending on the section.

The plural on-pixel ratio sections include a first section and a second section having an average on-pixel ratio higher than an average on-pixel ratio of the first section, and a level of the second offset voltage corresponding to the first section is higher than a level of the second offset voltage corresponding to the second section.

The light emitting element includes an anode electrode and a cathode electrode, the bypass transistor is connected to the anode electrode, and the cathode electrode receives a reference voltage.

The display device further includes an adding unit that adds the reference voltage, the first offset voltage, and the second offset voltage to one another to output a preliminary initialization voltage.

The display device further includes a fade in/out controlling unit that receives a first preliminary initialization voltage of an N-th frame and a second preliminary initialization voltage of an (N+1)th frame, which are output from the adding unit, and outputs the initialization voltage having a voltage level between the first preliminary initialization voltage and the second preliminary initialization voltage.

The black image detecting unit determines to proceed with the subsequent operation when the dense area of the pixels to which the black data are applied is less than or equal to a predetermined percent with respect to an entire display area, and the image analyzing unit analyzes the image data only when the dense area of the pixels to which the black data are applied is less than or equal to the predetermined percent with respect to the entire display area.

The second offset voltage is about 0 volts when the dense area of the pixels to which the black data are applied is greater than a predetermined percent with respect to an entire display area.

According to an exemplary embodiment of the inventive concept, in a method of driving a display device, which includes pixels each including a light emitting element and a bypass transistor, the light emitting element includes an anode electrode and a cathode electrode receiving a reference voltage and the bypass transistor applies an initialization voltage to the anode electrode. The method includes determining a first offset voltage using a brightness period of image data and a temperature of a display panel, analyzing a grayscale of the image data to determine an image type of an image, determining a second offset voltage using the image type of the image, and adding the reference voltage, the first offset voltage, and the second offset voltage to one another to determine the initialization voltage.

The determining of the image type includes detecting black data among the image data and determining a dense area of the pixels to which the black data are applied. The image type is determined when the dense area of the pixels to which the black data are applied is less than or equal to a predetermined percent with respect to an entire display area.

When the dense area of the pixels to which the black data are applied is greater than the predetermined percent with respect to the entire display area, a sum of the first offset voltage and the second offset voltage is set to be less than or equal to a cut-in voltage of the light emitting element.

When the dense area of the pixels to which the black data are applied is greater than the predetermined percent with respect to the entire display area, the second offset voltage is set to about 0 volts.

The determining of the image type includes analyzing an image histogram for each grayscale of the image data.

The determining of the image type includes determining an average on-pixel ratio of the image data.

According to an exemplary embodiment of the inventive concept, a display device includes a display panel including a pixel, where the pixel includes a light emitting element and a bypass transistor connected to the light emitting element and receiving an initialization voltage, a first offset voltage determining unit determining a first offset voltage using a brightness period of image data and a temperature of the display panel, and a second offset voltage determining unit determining a second offset voltage depending on an image type according to an image histogram for each grayscale of the image data or to an average on-pixel ratio of the image data. The initialization voltage is determined using the first offset voltage and the second offset voltage.

BRIEF DESCRIPTION OF THE DRAWINGS

The above and other features of the inventive concept will become readily apparent by describing in detail exemplary embodiments thereof with reference to the accompanying drawings.

DETAILED DESCRIPTION OF AN EXEMPLARY EMBODIMENTS

Figure 1:
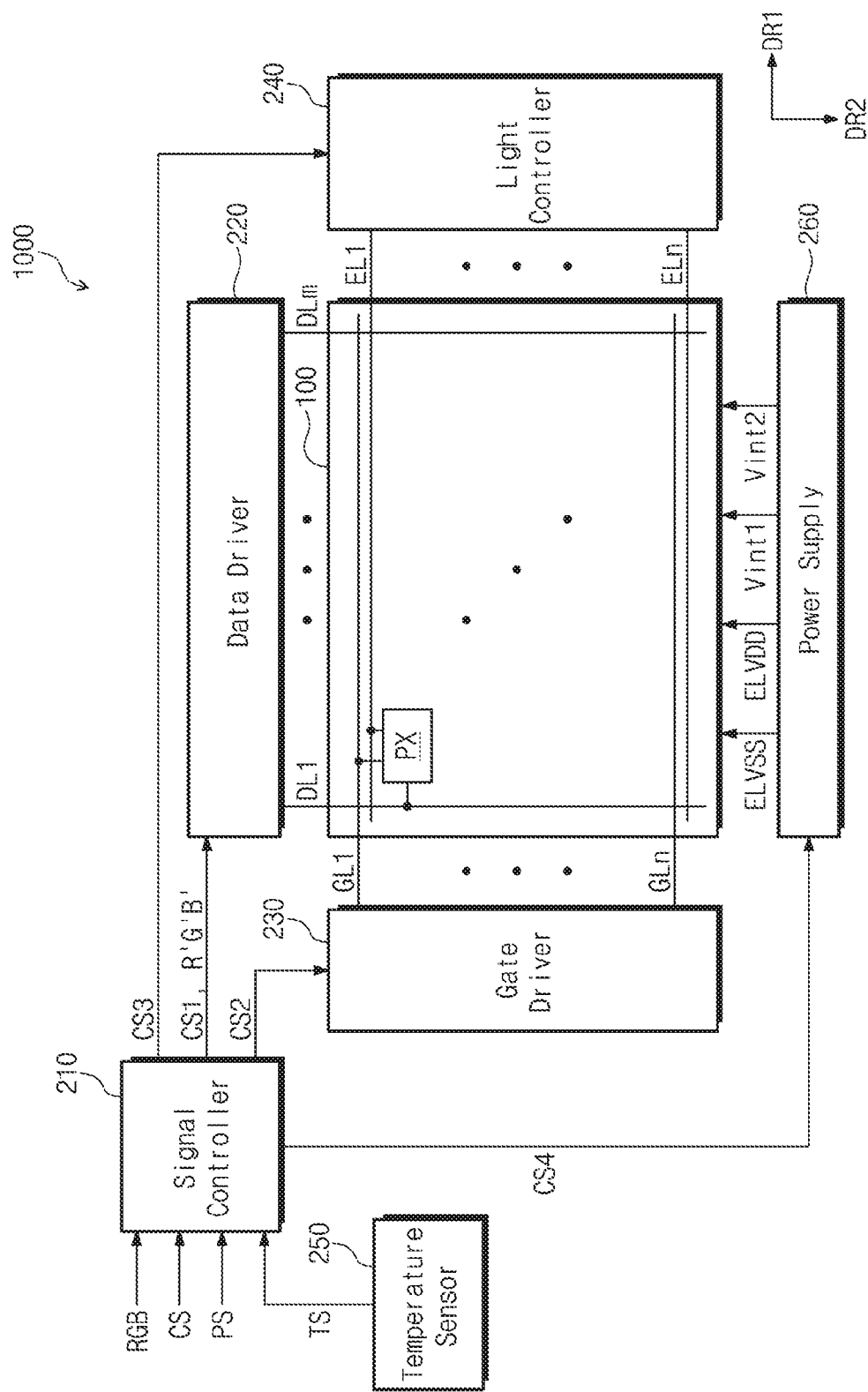
FIG. 1 is a block diagram showing a display device according to an exemplary embodiment of the inventive concept.

Exemplary embodiments of the inventive concept provide a display device having improved display characteristics by adaptively applying an initialization voltage to a light emitting element.

Exemplary embodiments of the inventive concept also provide a method of driving the display device.

Hereinafter, exemplary embodiments of the inventive concept will be explained in detail with reference to the accompanying drawings. Like reference numerals may refer to like elements throughout this application.

FIG. 1 is a block diagram showing a display device according to an exemplary embodiment of the inventive concept.

Referring to FIG. 1, a display device 1000 includes a display panel 100, a signal controller 210, a data driver 220, a gate driver 230, a light emitting controller 240, a temperature sensor 250, and a power supply 260.

The display panel 100 may be, but not limited to, an organic light emitting display panel. The display panel 100 includes a plurality of data lines DL1 to DLm, a plurality of gate lines GL1 to GLn, a plurality of light emitting control lines EL1 to ELn, and a plurality of pixels PX.

The gate lines GL1 to GLn and the light emitting control lines EL1 to ELn extend in a first direction DR1 and are arranged in a second direction DR2 crossing the first direction DR1. The data lines DL1 to DLm extend in the second direction DR2 and are arranged in the first direction DR1.

The data lines DL1 to DLm, the light emitting control lines EL1 to ELn, and the gate lines GL1 to GLn define pixel areas, and the pixels PX displaying an image are arranged in the pixel areas. FIG. 1 shows a pixel PX connected to a first data line DL1, a first gate line GL1, and a first light emitting control line EL1 as a representative example.

The pixel PX displays primary color or mixed color. The primary color include red, green, or blue colors, and the mixed color include one of various colors, e.g., white, yellow, cyan, or magenta, etc. However, the colors displayed by the pixel PX are not limited thereto.

The signal controller 210 (or a timing controller) receives control signals CS, image data RGB, and a power source voltage PS, which are provided from the outside of the signal controller 210. As an example, the power source voltage PS may be provided from a battery.

The signal controller 210 applies a first control signal CS1 and image data signals R'G'B' to the data driver 220, applies a second control signal CS2 to the gate driver 230, applies a third control signal CS3 to the light emitting controller 240, and applies a fourth control signal CS4 to the power supply 260.

The first control signal CS1 is used to control the data driver 220, the second control signal CS2 is used to control the gate driver 230, the third control signal CS3 is used to control the light emitting controller 240, and the fourth control signal CS4 is used to control the power supply 260.

The data driver 220 applies data signals to the data lines DL1 to DLm in response to the first control signal CS1. The data driver 220 may be implemented in an independent integrated circuit chip to be electrically connected to one side of the display panel 100, or the data driver 220 may be integrated in a predetermined area of the display panel 100. In the case that the data driver 220 is provided in the independent integrated circuit chip, the integrated circuit chip may be provided in a single or plural chips.

The gate driver 230 applies gate signals to the gate lines GL1 to GLn in response to the second control signal CS2. The gate driver 230 may be integrated in a predetermined area of the display panel 100. The gate driver 230 may be implemented in a circuit with an amorphous silicon gate (ASG) using an amorphous silicon thin film transistor (a-Si TFT), an oxide semiconductor, a crystalline semiconductor, a polycrystalline semiconductor, or the like. In addition, the gate driver 230 may be electrically connected to one side of the display panel 100 after being implemented in an independent integrated circuit chip.

The light emitting controller 240 may apply light emitting control signals to the light emitting control lines EL1 to ELn in response to the third control signal CS3. The light emitting controller 240 may be integrated in a predetermined area of the display panel 100 or electrically connected to one side of the display panel 100 after being implemented in an independent integrated circuit chip.

The temperature sensor 250 may sense a temperature of the display device 1000 and apply a temperature sensing signal TS corresponding to the sensed temperature to the signal controller 210. The temperature sensor 250 may be integrated in a predetermined area of the display panel 100. In this case, the temperature sensor 250 may sense the temperature of the display panel 100. The temperature sensor 250 may include an active element whose predetermined value varies depending on the temperature, or a passive element. As an example, the temperature sensor 250 may include an element whose resistance is changed, or a diode or a transistor whose offset voltage is changed, depending on the temperature. However, the temperature sensor 250 is not limited thereto.

The power supply 260 may apply a first reference voltage ELVDD, a second reference voltage ELVSS, a first initialization voltage Vint1, and a second initialization voltage Vint2 to the display panel 100 in response to the fourth control signal CS4.

The signal controller 210, the data driver 220, the gate driver 230, the light emitting controller 240, the temperature sensor 250, and the power supply 260 may be implemented by a set of electronic circuits. At least some of the signal controller 210, the data driver 220, the gate driver 230, the light emitting controller 240, the temperature sensor 250, and the power supply 260 may be integrated in the same chip. As an example, the signal controller 210 and the power supply 260 may be integrated in the same chip, however, the inventive concept is not limited thereto.

The second initialization voltage Vint2 according to an exemplary embodiment of the inventive concept may be determined by taking into account a brightness period of the image data RGB, the temperature of the display panel 100, and a type of the image. The image type may be determined by analyzing an image histogram for each grayscale of the image data RGB or an average on-pixel ratio of the image data RGB. According to an exemplary embodiment of the inventive concept, the second initialization voltage Vint2 may be adaptively set according to the image type.

As an example, when the image data RGB including a black image is input, the signal controller 210 may control the second initialization voltage Vint2 to prevent the pixels displaying the black image from emitting light. In addition, when the image data RGB not including the black image is input, the signal controller 210 may control the second initialization voltage Vint2 such that a frame response speed is increased. This will be described in more detail with reference to FIGS. 3 to 5.

Figure 2:
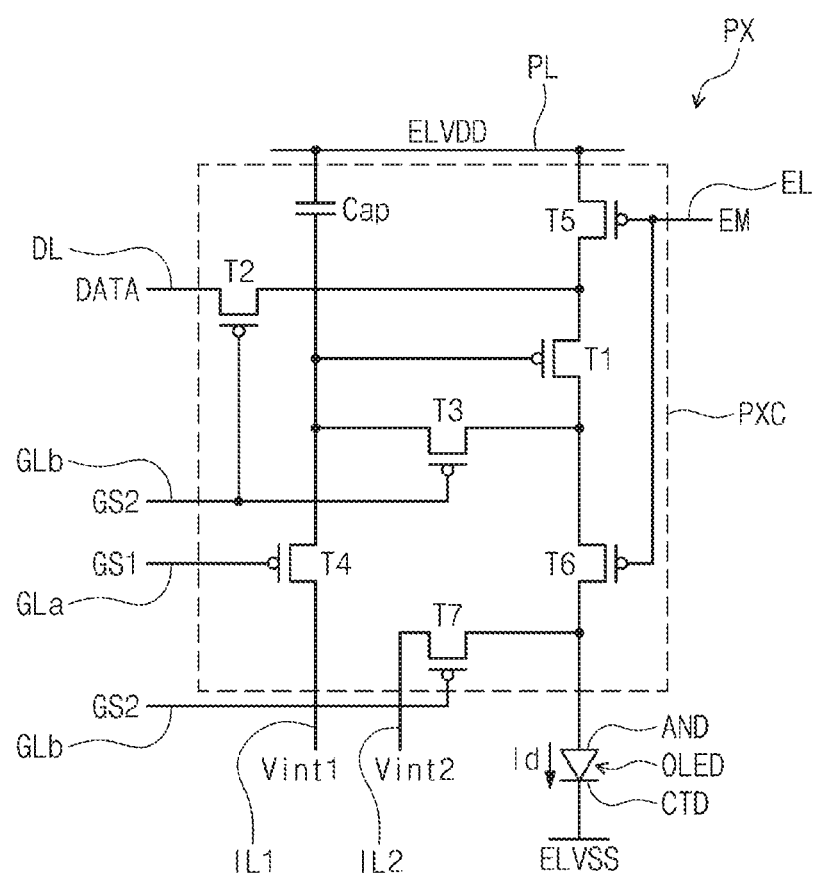
FIG. 2 is an equivalent circuit diagram showing a pixel of FIG. 1 according to an exemplary embodiment of the inventive concept.

FIG. 2 is an equivalent circuit diagram showing a pixel of FIG. 1 according to an exemplary embodiment of the inventive concept.

Referring to FIG. 2, the pixel PX includes a pixel circuit PXC and a light emitting element OLED.

The light emitting element OLED includes an organic light emitting diode, but is not limited thereto. In other words, the light emitting element OLED may include an inorganic light emitting diode or an organic-inorganic hybrid light emitting diode depending on the type of the display panel 100 (refer to FIG. 1).

The pixel circuit PXC includes a plurality of transistors T1 to T7 and a storage capacitor Cap. The transistors T1 to T7 include a driving transistor T1, a switching transistor T2, a compensation transistor T3, an initialization transistor T4, a first light emitting control transistor T5, a second light emitting control transistor T6, and a bypass transistor T7.

The pixel circuit PXC is connected to a first gate line GLa transmitting a first gate signal GS1 to a gate electrode of the initialization transistor T4, a second gate line GLb transmitting a second gate signal GS2 to a gate electrode of each of the switching transistor T2, the compensation transistor T3, and the bypass transistor T7, a light emitting control line EL transmitting a light emitting control signal EM to a gate electrode of each of the first light emitting control transistor T5 and the second light emitting control transistor T6, a data line DL transmitting a data signal DATA, a power line PL transmitting the first reference voltage ELVDD, a first initialization line IL1 transmitting the first initialization voltage Vint1 to initialize the driving transistor T1, and a second initialization line IL2 transmitting the second initialization voltage Vint2 to initialize an anode electrode AND of the light emitting element OLED.

A gate electrode of the driving transistor T1 is connected to a first electrode of the storage capacitor Cap. A source electrode of the driving transistor T1 is connected to the power line PL via the first light emitting control transistor T5. A drain electrode of the driving transistor T1 is electrically connected to the anode electrode AND of the light emitting element OLED via the second light emitting control transistor T6. The driving transistor T1 receives the data signal DATA in accordance with a switching operation of the switching transistor T2 to supply a driving current Id to the light emitting element OLED.

The gate electrode of the switching transistor T2 is connected to the second gate line GLb. A source electrode of the switching transistor T2 is connected to the data line DL. A drain electrode of the switching transistor T2 is connected to the source electrode of the driving transistor T1 and connected to the power line PL via the first light emitting control transistor T5. The switching transistor T2 is turned on in response to the second gate signal GS2 applied thereto through the second gate line GLb and performs the switching operation to apply the data signal DATA to the source electrode of the driving transistor T1. As an example, the switching transistor T2 is turned on when the second gate signal GS2 is at a low level. In this case, the storage capacitor Cap stores a voltage corresponding to the data signal DATA.

The gate electrode of the compensation transistor T3 is connected to the second gate line GLb. A source electrode of the compensation transistor T3 is connected to the drain electrode of the driving transistor T1 and connected to the anode electrode AND of the light emitting element OLED via the second light emitting control transistor T6. A drain electrode of the compensation transistor T3 is connected to the first electrode of the storage capacitor Cap, a source electrode of the initialization transistor T4, and the gate electrode of the driving transistor T1. The compensation transistor T3 is turned on in response to the second gate signal GS2 applied thereto through the second gate line GLb to connect the gate electrode of the driving transistor T1 to the drain electrode of the driving transistor T1, and thus the driving transistor T1 is connected in a diode configuration.

The gate electrode of the initialization transistor T4 is connected to the first gate line GLa. A drain electrode of the initialization transistor T4 is connected to the first initialization line IL1. The source electrode of the initialization transistor T4 is connected to the first electrode of the storage capacitor Cap, the drain electrode of the compensation transistor T3, and the gate electrode of the driving transistor T1. The initialization transistor T4 is turned on in response to the first gate signal GS1 applied thereto through the first gate line GLa to transmit the first initialization voltage Vint1 to the gate electrode of the driving transistor T1, thus initializing the voltage of the gate electrode of the driving transistor T1. As an example, the initialization transistor T4 may be turned on when the first gate signal GS1 is at the low level.

The gate electrode of the first light emitting control transistor T5 is connected to the light emitting control line EL. The first light emitting control transistor T5 is connected between the power line PL and the driving transistor T1. A source electrode of the first light emitting control transistor T5 is connected to the power line PL. A drain electrode of the first light emitting control transistor T5 is connected to the source electrode of the driving transistor T1 and the drain electrode of the switching transistor T2.

The gate electrode of the second light emitting control transistor T6 is connected to the light emitting control line EL. The second light emitting control transistor T6 is connected between the driving transistor T1 and the light emitting element OLED. A source electrode of the second light emitting control transistor T6 is connected to the drain electrode of the driving transistor T1 and the source electrode of the compensation transistor T3. A drain electrode of the second light emitting control transistor T6 is connected to the anode electrode AND of the light emitting element OLED.

The first light emitting control transistor T5 and the second light emitting control transistor T6 are turned on in response to the light emitting control signal EM applied thereto through the light emitting control line EL. The first light emitting control transistor T5 and the second light emitting control transistor T6 are turned on in response to the light emitting control signal EM applied to the gate electrode of the first light emitting control transistor T5 and the second light emitting control transistor T6, and thus the driving current Id flows through the light emitting element OLED. The first light emitting control transistor T5 and the second light emitting control transistor T6 may determine a timing at which the driving current Id flows through the light emitting element OLED.

The light emitting control signal EM may include an ON level and an OFF level. In the present exemplary embodiment, the ON level may indicate that the light emitting control signal EM is at a low level, and the OFF level may indicate that the light emitting control signal EM is at a high level. When the light emitting control signal EM is at the high level, the first light emitting control transistor T5 and the second light emitting control transistor T6 are turned off. When the first light emitting control transistor T5 is turned off, the power line PL and the source electrode of the driving transistor T1 are electrically disconnected from each other.

Accordingly, the light emitting element OLED may not emit the light while the light emitting control signal EM having the high level is provided.

The gate electrode of the bypass transistor T7 is connected to the second gate line GLb. A source electrode of the bypass transistor T7 is connected to the anode electrode AND of the light emitting element OLED. A drain electrode of the bypass transistor T7 is connected to the second initialization line IL2. The bypass transistor T7 is turned on in response to the second gate signal GS2 applied thereto through the second gate line GLb to initialize the anode electrode AND of the light emitting element OLED. The anode electrode AND of the light emitting element OLED may be initialized by the second initialization voltage Vint2 when the data signal DATA is provided.

In the present exemplary embodiment, the second initialization voltage Vint2 may have various voltages. A case in which the image data RGB are of a first image type and a case in which the image data RGB are of a second image type will be described as representative examples. The first image type may indicate an image type in which a ratio of an area of the black image to an area of the entire image is larger than a predetermined ratio, and the second image type may indicate an image type in which a ratio of the area of the black image to the area of the entire image is less than or equal to the predetermined ratio.

As an example, the signal controller 210 (refer to FIG. 1) may set a level of the second initialization voltage Vint2 to be lower than a level of the second reference voltage ELVSS in the first image type. In this case, electric charges charged in the light emitting element OLED may be discharged by the second initialization voltage Vint2. Accordingly, a leakage current may be prevented from entering the light emitting element OLED, and the light emitting element OLED may be prevented from emitting light. However, the level of the second initialization voltage Vint2 in the first image type is not limited thereto.

As an example, the level of the second initialization voltage Vint2 in the first image type may be set within a range where a phenomenon, in which the image looks brighter than a desired brightness in the light emitting element OLED applied with the black data, does not occur. For example, the level of the second initialization voltage Vint2 may be set to allow a difference between the second initialization voltage Vint2 and the second reference voltage ELVSS to be equal to or lower than a cut-in voltage. The cut-in voltage may be the lowest voltage that allows the current to flow through the light emitting element OLED so that the light emitting element OLED emits light. The lowest voltage may be, for example, about 0.5 volts.

The signal controller 210 (refer to FIG. 1) may set the level of the second initialization voltage Vint2 to be higher than the level of the second reference voltage ELVSS in the second image type. In this case, a forward bias may be applied to the light emitting element OLED, and as a result, the frame response speed may be increased.

A second electrode of the storage capacitor Cap is connected to the power line PL. The first electrode of the storage capacitor Cap is connected to the gate electrode of the driving transistor T1, the drain electrode of the compensation transistor T3, and the source electrode of the initialization transistor T4.

A cathode electrode CTD of the light emitting element OLED receives the second reference voltage ELVSS. The light emitting element OLED receives the driving current Id from the driving transistor T1 and emits the light.

When the light emitting control signal EM has the ON level, e.g., the low level, the first light emitting control transistor T5 and the second light emitting control transistor T6 are turned on. When the first light emitting control transistor T5 is turned on, the first reference voltage ELVDD is applied to the source electrode of the driving transistor T1. When the second light emitting control transistor T6 is turned on, the drain electrode of the driving transistor T1 is electrically connected to the anode electrode AND of the light emitting element OLED. Accordingly, the light emitting element OLED generates the light having a predetermined brightness in response to the amount of the driving current Id.

According to exemplary embodiments of the inventive concept, the number of the transistors T1 to T7 and the number of storage capacitors of the pixel PX and the connection relation between the transistors T1 to T7 and the storage capacitors may be changed in various ways.

Figure 3:
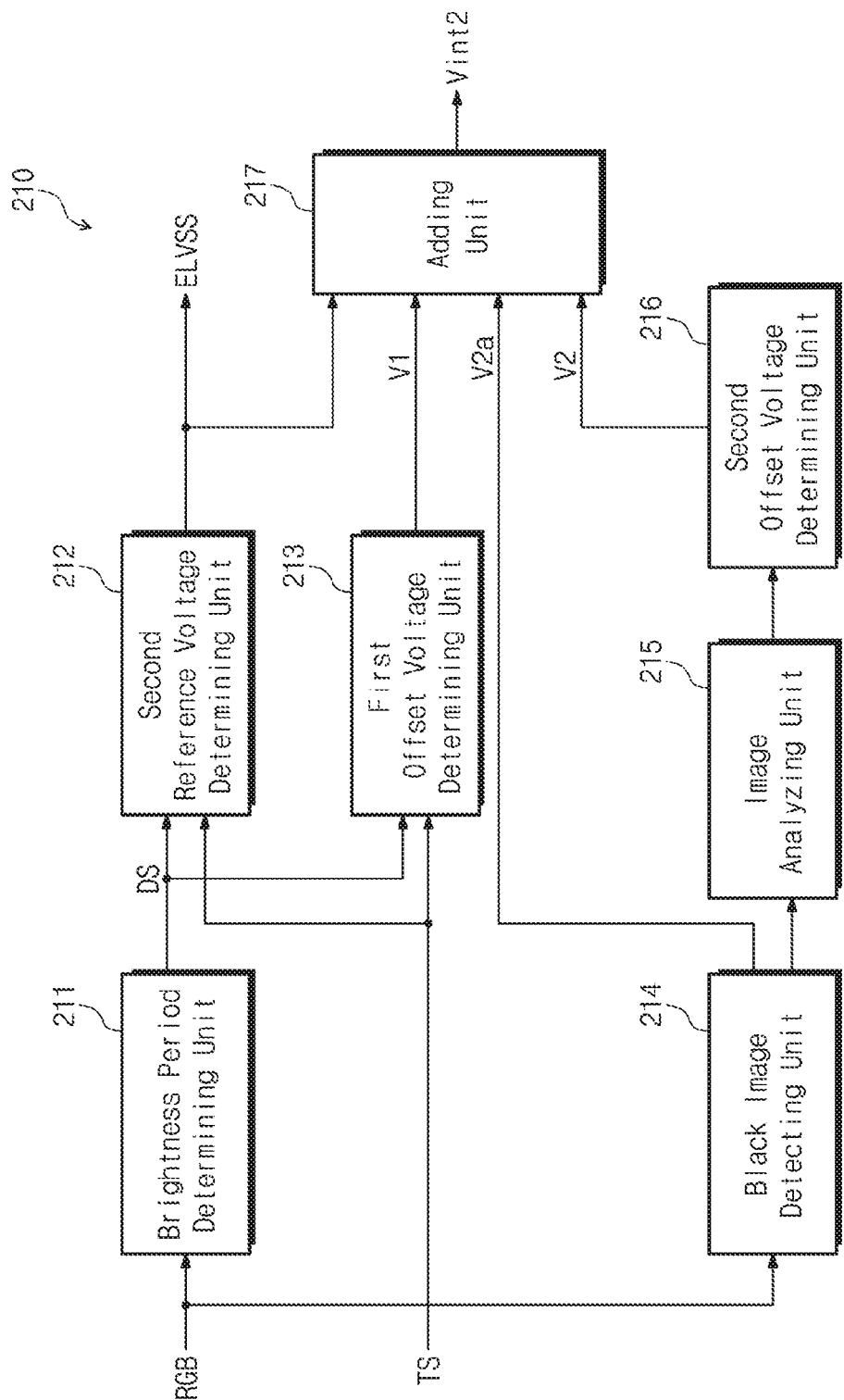
FIG. 3 is a block diagram showing a signal controller of FIG. 1 according to an exemplary embodiment of the inventive concept.

FIG. 3 is a block diagram showing a signal controller of FIG. 1 according to an exemplary embodiment of the inventive concept.

FIG. 3 shows blocks of circuits having functions that set the second reference voltage ELVSS and the second initialization voltage Vint2 of the signal controller 210. The signal controller 210 may be provided in the form of an integrated circuit (IC), and each block is separated to describe its function. In other words, each block of the signal controller 210 may include a plurality of circuit elements and wirings.

The signal controller 210 may include a brightness period determining unit 211, a second reference voltage determining unit 212, a first offset voltage determining unit 213, a black image detecting unit 214, an image analyzing unit 215, a second offset voltage determining unit 216, and an adding unit 217.

The brightness period determining unit 211 may receive the image data RGB and determine a brightness period of the image data RGB. The brightness period may include a plurality of brightness stages that are previously set with respect to a maximum brightness. Table 1 below shows the brightness period. A normal mode may be a display mode in which the display panel 100 (refer to FIG. 1) is driven at about 60 Hz, and a high frequency mode may be a display mode in which the display panel 100 is driven at a frequency greater than or equal to about 75 Hz. The brightness stages may be classified differently depending on the mode in which the image is displayed. However, according to an exemplary embodiment of the inventive concept, the high frequency mode may be omitted. In addition, according to an exemplary embodiment of the inventive concept, a low frequency mode may be added.

TABLE 1

|  | Brightness stages |
| --- | --- |
| Normal mode | 750 cd/m² |
|  | 650 cd/m² |
|  | 300 cd/m² |
|  | 100 cd/m² |
|  | 60 cd/m² |
|  | 30 cd/m² |
|  | 15 cd/m² |
|  | 10 cd/m² |
|  | 7 cd/m² |
|  | 4 cd/m² |
|  | 2 cd/m² |
| High frequency mode | 100 cd/m² |
|  | 60 cd/m² |
|  | 45 cd/m² |
|  | 30 cd/m² |

The brightness period determining unit 211 may determine the brightness period of the image data RGB and output a brightness period signal DS including information about the brightness period to the second reference voltage determining unit 212 and the first offset voltage determining unit 213.

The second reference voltage determining unit 212 may receive the brightness period signal DS and the temperature sensing signal TS and determine the second reference voltage ELVSS corresponding to the brightness period and the temperature. The second reference voltage ELVSS may be selected from fixed values set according to the brightness period and the temperature.

The first offset voltage determining unit 213 may receive the brightness period signal DS and the temperature sensing signal TS and determine a first offset voltage V1 corresponding to the brightness period signal DS and the temperature sensing signal TS. As an example, the first offset voltage determining unit 213 may include a table in which data corresponding to the brightness and the temperature are mapped. Table 2 shows an example of the table.

TABLE 2

| Brightness | Temperature | | | |
| --- | --- | --- | --- | --- |
| (cd/m²) | 25° C. | 0° C. | −10° C. | −20° C. |
| Normal mode 750 | (x)bits | (x)bits | (x)bits | (x)bits |
| 650 | (x)bits | (x)bits | (x)bits | (x)bits |
| 300 | (x)bits | (x)bits | (x)bits | (x)bits |
| 100 | (x)bits | (x)bits | (x)bits | (x)bits |
| 60 | (x)bits | (x)bits | (x)bits | (x)bits |
| 30 | (x)bits | (x)bits | (x)bits | (x)bits |
| 15 | (x)bits | (x)bits | (x)bits | (x)bits |
| 10 | (x)bits | (x)bits | (x)bits | (x)bits |
| 7 | (x)bits | (x)bits | (x)bits | (x)bits |
| 4 | (x)bits | (x)bits | (x)bits | (x)bits |
| 2 | (x)bits | (x)bits | (x)bits | (x)bits |
| High frequency mode 100 | (x)bits | (x)bits | (x)bits | (x)bits |
| 60 | (x)bits | (x)bits | (x)bits | (x)bits |
| 45 | (x)bits | (x)bits | (x)bits | (x)bits |
| 30 | (x)bits | (x)bits | (x)bits | (x)bits |

Referring to Table 2, the first offset voltage determining unit 213 may store data corresponding to each brightness value and each temperature. According to Table 2, the data may have data of (x) bits. As an example, the "x" may be nine (9).

In the present exemplary embodiment, the data may be values (e.g., memory address values) to use a memory in which offset voltage values are stored. Table 3 below shows an example of the memory. In a case that the data indicate "00" in Table 3, the first offset voltage V1 may be about 1.5 volts, and in a case that the data indicate "0F" in Table 3, the first offset voltage V1 may be about 0 volts.

TABLE 3

| Hex | Offset voltage (V) |
| --- | --- |
| 00 | 1.5 |
| 01 | 1.4 |
| 02 | 1.3 |
| 03 | 1.2 |
| ... | ... |
| 0E | 0.1 |
| 0F | 0.0 |
| 10 | −0.1 |
| ... | ... |
| 1B | −1.2 |

TABLE 3-continued

| Hex | Offset voltage (V) |
|---|---|
| 1C | −1.3 |
| 1D | −1.4 |
| 1E | −1.5 |

In addition, according to an exemplary embodiment of the inventive concept, the data may directly include the value of the first offset voltage V1. In this case, the memory may be omitted. A maximum value of the first offset voltage V1 may be set within a range in which the black image is not recognized by the user. The black image is recognized by the user when the light emitting element OLED (refer to FIG. 2) of the pixel displaying the black image emits the light to be displayed at a predetermined brightness and the user recognizes the predetermined brightness.

The maximum value of the first offset voltage V1 may be set within a range not exceeding a brightness calculated by the following Equation.

$$\text{Maximum value} = \text{Maximum brightness} \times (\text{reference grayscale/maximum grayscale})^{gamma\ value} \quad \text{Equation}$$

Hereinafter, an example in which the gamma value of the display panel 100 (refer to FIG. 1) has a value between about 2.1 and about 2.3, the maximum brightness is about 750 cd/m$^2$, and the maximum gamma grayscale is 255 will be described. The reference grayscale may have a low grayscale. The reference grayscale may be less than or equal to 48. For example, the reference grayscale may be 11.

In this case, when the gamma value is about 2.1, the maximum value obtained by the Equation may be about 1.019 cd/m$^2$. The maximum value of the first offset voltage V1 may be controlled not to exceed the calculated maximum value. As an example, the maximum value of the first offset value V1 may be set to a voltage value having a brightness of about 0.870 cd/m$^2$ that is obtained when the gamma value is about 2.15 by taking into account a process variation. In other words, although the first offset value V1 is set to about 1.5 volts that is the maximum voltage, the light emitted from the light emitting element OLED may not exceed about 0.870 cd/m$^2$.

The black image detecting unit 214 detects black data among the image data RGB. The black image detecting unit 214 determines a dense area of the pixels to which the black data are applied.

The black data may include the image data RGB in which a display brightness is greater than or equal to about 0 cd/m$^2$ and less than or equal to about 0.1 cd/m$^2$; however, a reference for the black data may be changed in various ways. As an example, the reference for the black data may indicate that the display brightness is greater than or equal to about 0 cd/m$^2$ and less than or equal to about 0.005 cd/m$^2$.

The black image detecting unit 214 may determine the dense area of the pixels to which the black data are applied. As an example, the black image detecting unit 214 may calculate a rate of an area of the dense area in which the pixels displaying the black data are arranged with respect to an area of the entire display area, to determine a rate of the dense area of the pixels to which the black data are applied.

The black image detecting unit 214 may determine whether the dense area rate is greater than a reference rate. The reference rate may be about 10 percent. However, the reference for the dense area rate may be changed depending on user's cognitive characteristics. As an example, the reference for the dense area rate may be about 5 percent.

The black image detecting unit 214 may determine whether to proceed with a subsequent operation based on the dense area rate. As an example, when the dense area rate is greater than the reference rate, the black image detecting unit 214 may determine not to proceed with the subsequent operation, and when the dense area rate is less than or equal to the reference rate, the black image detecting unit 214 may determine to proceed with the subsequent operation. The subsequent operation may be an operation performed by the image analyzing unit 215.

When the dense area rate is greater than the reference rate, the black image detecting unit 214 may output a second offset voltage V2a. The second offset voltage V2a may be less than or equal to about 0 volts. As an example, the second offset voltage V2a may be about 0 volts.

When the dense area rate is greater than the reference rate and the second offset voltage V2a has a value greater than about 0 volts, a level of the second initialization voltage Vint2 applied to the anode electrode AND (refer to FIG. 2) may increase. In this case, the forward bias may be applied to the light emitting element OLED (refer to FIG. 2), and thus the light emitting element OLED may emit the light.

When the light emitting element OLED emits the light even though the black data are applied to the light emitting element OLED, the light emission of the black image may be visible to the user since the dense area rate is greater than the reference rate. In other words, the phenomenon in which the image looks brighter than the desired brightness in the light emitting element OLED, applied with the black data, may occur. However, according to the present exemplary embodiment, when the dense area rate is greater than the reference rate, the second offset voltage V2a decreases to a voltage less than or equal to about 0 volts. Accordingly, the level of the second initialization voltage Vint2 may be prevented from increasing, and thus, the above-described phenomenon may be prevented from occurring.

In FIG. 3, the black image detecting unit 214 directly outputs the second offset voltage V2a to the adding unit 217 when the dense area rate is greater than the reference rate, but the inventive concept is not limited thereto. As an example, when the dense area rate is greater than the reference rate, the black image detecting unit 214 may output a predetermined signal to the second offset voltage determining unit 216. In this case, the second offset voltage determining unit 216 may output the second offset voltage V2a, corresponding to the predetermined signal, to the adding unit 217.

The image analyzing unit 215 may be operated depending on the determination of the black image detecting unit 214. In other words, when the dense area rate is less than or equal to the reference rate, the operation of the image analyzing unit 215 may be performed. Accordingly, power consumption efficiency may be improved since the operation of the image analyzing unit 215 is performed only when necessary.

The image analyzing unit 215 may analyze the image histogram for each grayscale of the image data RGB or the average on-pixel ratio of the image data RGB. This will be described in detail with reference to FIGS. 4 and 5.

The image analyzing unit 215 outputs the analyzed result of the image data RGB to the second offset voltage determining unit 216.

The second offset voltage determining unit 216 may receive the analyzed result and determine the second offset voltage V2 corresponding to the analyzed result. As an example, the second offset voltage determining unit 216 may include a table in which the data corresponding to the image type are mapped. Table 4 shows an example of the table.

TABLE 4

| Image type | Data |
|---|---|
| Type 1 | (x)bits |
| Type 2 | (x)bits |
| Type 3 | (x)bits |
| Type 4 | (x)bits |
| ... | ... |
| Type X | (x)bits |

Referring to Table 4, the second offset voltage determining unit 216 may store the data corresponding to the image type. In Table 4, the data may have (x) bits. As an example, "x" may be nine.

In the present exemplary embodiment, the data may be the values (e.g., memory address values) to use the memory in which the offset voltage values are stored. The example of the memory is as shown in Table 3 above.

The first offset voltage determining unit 213 and the second offset voltage determining unit 216 may read out the offset voltage values from the same memory (e.g., Table 3); however, the inventive concept is not limited thereto. For example, the first offset voltage determining unit 213 and the second offset voltage determining unit 216 may determine the first offset voltage V1 and the second offset voltage V2 with reference to different memories. In addition, the data shown in Table 4 according to the exemplary embodiment of the inventive concept may directly include the value of the second offset voltage V2. In this case, the memory shown in Table 3 may be omitted.

The adding unit 217 receives the second reference voltage ELVSS, the first offset voltage V1, and the second offset voltage V2a or V2. The adding unit 217 adds the second reference voltage ELVSS, the first offset voltage V1, and the second offset voltage V2a or V2 to one another to output the second initialization voltage Vint2.

Figure 4:
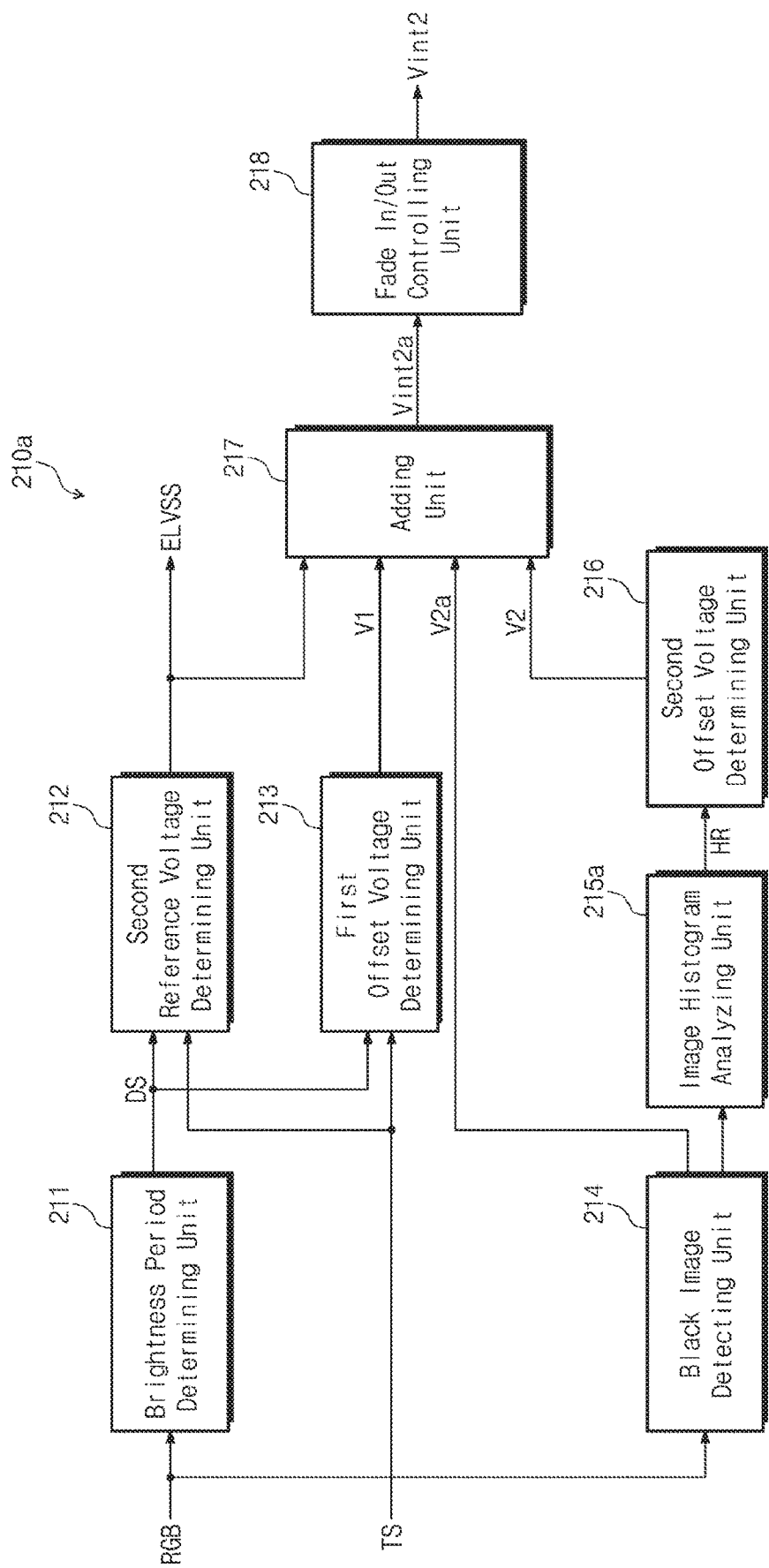
FIG. 4 is a block diagram showing a signal controller according to an exemplary embodiment of the inventive concept.

FIG. 4 is a block diagram showing a signal controller according to an exemplary embodiment of the inventive concept. In FIG. 4, the same reference numerals denote the same elements in FIG. 3, and thus detailed descriptions of the same elements will be omitted.

Referring to FIG. 4, a signal controller 210a may include an image histogram analyzing unit 215a instead of the image analyzing unit 215 (refer to FIG. 3).

The image histogram analyzing unit 215a may receive the image data RGB of every frame and generate a histogram for each grayscale based on the image data RGB. The image histogram analyzing unit 215a may store frequency of data corresponding to each grayscale value of one frame as a look-up table. The image histogram analyzing unit 215a may output a histogram analysis result HR of the image data RGB to the second offset voltage determining unit 216.

In addition, the image histogram analyzing unit 215a may generate the histogram for each color of the image data RGB. The histogram analysis result HR may include the histogram analysis result with respect to each color.

The second offset voltage determining unit 216 may determine the image type of the image data RGB based on the histogram analysis result HR.

The image type may be set in various ways. Hereinafter, an example of the image type will be described. For example, a first image type indicates a type in which a data frequency of a first low grayscale (e.g., a grayscale greater than or equal to 0 grayscale level and less than or equal to 40 grayscale level) occupies the highest rate in the entire data, and the rate is greater than or equal to about 30% or less than or equal to about 50%. A second image type indicates a type in which a data frequency of a low grayscale (e.g., a grayscale greater than or equal to 41 grayscale level and less than or equal to 80 grayscale level) occupies the highest rate in the entire data, and the rate is greater than or equal to about 30% or less than or equal to about 50%. A third image type indicates a type in which a data frequency of an intermediate grayscale (e.g., a grayscale greater than or equal to 81 grayscale level and less than or equal to 120 grayscale level) occupies the highest rate in the entire data, and the rate is greater than or equal to about 30% or less than or equal to about 50%. The first, second, and third image types are merely exemplary, and the inventive concept is not limited thereto.

A first frame response speed may be slower in the image with low grayscale than that in the image with high grayscale. Accordingly, the second offset voltage determining unit 216 may set the level of the second offset voltage V2 to a relatively high value when the image type is the type in which the data frequency of the low grayscale is relatively high. As an example, the level of the second offset voltage V2 obtained when the image type is the first image type may be higher than the level of the second offset voltage V2 obtained when the image type is the third image type.

The image data RGB, whose image type is determined by the second offset voltage determining unit 216 subsequent to the image histogram analyzing unit 215a, correspond to the image determined by the black image detecting unit 214 as having the dense area rate of the area in which the pixels displaying the black data are arranged with respect to the entire display area that is less than or equal to the reference rate. In other words, although the forward bias is applied to both ends of the light emitting element OLED (refer to FIG. 2) when the image corresponding to the first image type is displayed, the first frame response speed may be increased, and the phenomenon in which the image looks brighter than the desired brightness in the light emitting element OLED, applied with the black data, may be prevented from occurring. Therefore, the display characteristics of the display device 1000 (refer to FIG. 1) may be improved.

The image data RGB may include one or more color components. In this case, the second offset voltage determining unit 216 may determine the second offset voltage V2 by taking into account the color components. The first frame response speed may vary depending on the color components. As an example, the response speed of a pixel displaying a green color may be slowest among pixels displaying red, green, and blue colors. Accordingly, the image type may be determined in consideration of the color components.

For instance, although the image of one frame corresponds to the first image type, the image may be determined as a fourth image type when there are relatively much more green components. In this case, the level of the second offset voltage V2 obtained when the image type is the first image type and the level of the second offset voltage V2 obtained when the image type is the fourth image type may be different from each other. To improve the frame response speed of the fourth image type, the level of the second offset voltage V2 of the fourth image type may be higher than the level of the second offset voltage V2 of the first image type.

The adding unit 217 receives the second reference voltage ELVSS, the first offset voltage V1, and the second offset voltage V2a or V2. The adding unit 217 adds the second reference voltage ELVSS, the first offset voltage V1, and the second offset voltage V2a or V2 to one another to output a preliminary initialization voltage Vint2a to a fade in/out controlling unit 218.

The fade in/out controlling unit 218 may receive the preliminary initialization voltage Vint2a of each of a plurality of frames. For example, the fade in/out controlling unit 218 may receive a first preliminary initialization voltage Vint2a of an N-th frame and a second preliminary initialization voltage Vint2a of an (N+1)th frame. "N" is a positive integer number.

The fade in/out controlling unit 218 may include a comparator. The fade in/out controlling unit 218 may compare the first preliminary initialization voltage Vint2a with the second preliminary initialization voltage Vint2a to output the second initialization voltage Vint2 having a voltage level between the first preliminary initialization voltage Vint2a and the second preliminary initialization voltage Vint2a. Accordingly, the fade in/out controlling unit 218 may prevent the second initialization voltage Vin2 from being rapidly changed, and thus the image may be prevented from being distorted.

Figure 5:
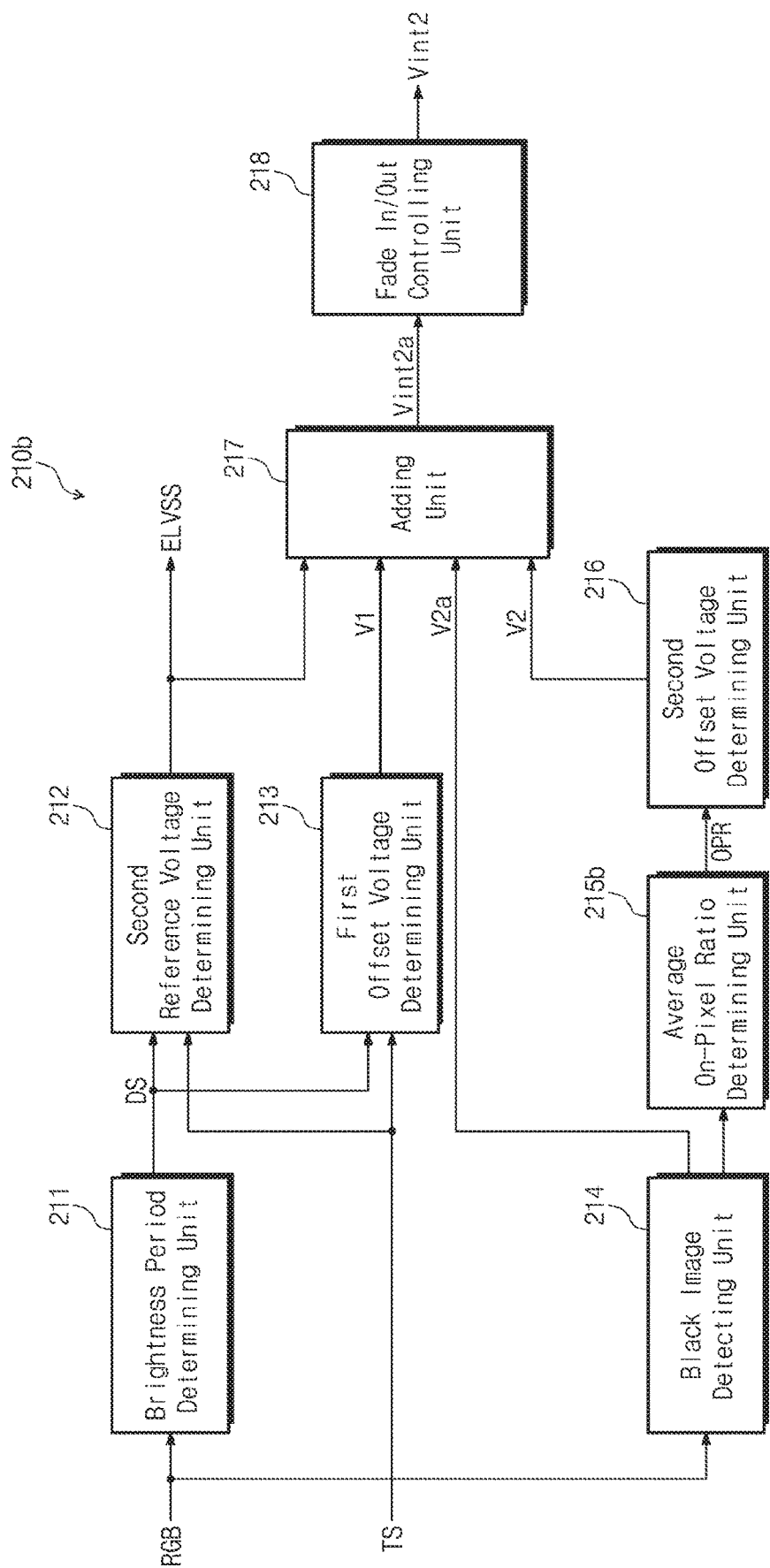
FIG. 5 is a block diagram showing a signal controller according to an exemplary embodiment of the inventive concept.

FIG. 5 is a block diagram showing a signal controller according to an exemplary embodiment of the inventive concept. In FIG. 5, the same reference numerals denote the same elements in FIGS. 3 and 4, and thus detailed descriptions of the same elements will be omitted.

Referring to FIG. 5, a signal controller 210b may include an average on-pixel ratio determining unit 215b instead of the image analyzing unit 215 (refer to FIG. 3).

The average on-pixel ratio determining unit 215b receives the image data RGB and calculates the average on-pixel ratio. The average on-pixel ratio may be calculated by the following Equation. The number of entire pixels may correspond to a resolution, and a maximum grayscale value may be 255.

Average on-pixel ratio=Σ(grayscale value of each pixel)/(number of entire pixels×maximum grayscale value)×100     Equation The average on-pixel ratio determining unit 215b may output an average on-pixel ratio signal OPR including average on-pixel ratio information to the second offset voltage determining unit 216. The average on-pixel ratio signal OPR includes numerical information about the average on-pixel ratio. The information may be a value.

The histogram analysis result HR (refer to FIG. 4) includes a look-up table storing the data frequency corresponding to each grayscale value of one frame. Since the average on-pixel ratio signal OPR of FIG. 5 includes only one value when compared with FIG. 4, data size may be relatively smaller than that of the exemplary embodiment of FIG. 4, and thus power consumption may be reduced.

The second offset voltage determining unit 216 may receive the average on-pixel ratio signal OPR and determine the second offset voltage V2 corresponding to the average on-pixel ratio signal OPR. As an example, the second offset voltage determining unit 216 may include a table in which data corresponding to sections of on-pixel ratio, which are divided into a plurality of numbers depending on the average on-pixel ratio information, are mapped. Table 5 shows an example of the table.

TABLE 5

| Average on-pixel ratio | Data |
| --- | --- |
| Greater than or equal to 0% and smaller than 10% | 9 bits |
| Greater than or equal to 10% and smaller than 20% | 9 bits |
| Greater than or equal to 20% and smaller than 30% | 9 bits |
| Greater than or equal to 30% and smaller than 40% | 9 bits |
| Greater than or equal to 40% and smaller than 50% | 9 bits |
| Greater than or equal to 50% and smaller than 60% | 9 bits |
| Greater than or equal to 60% and smaller than 70% | 9 bits |
| Greater than or equal to 70% and smaller than 80% | 9 bits |
| Greater than or equal to 80% and smaller than 100% | 9 bits |

The section of the average on-pixel ratio greater than or equal to 0% and smaller than 10% is referred to as a "first section", and the section of the average on-pixel ratio greater than or equal to 50% and smaller than 60% is referred to as a "second section". The level of the second offset voltage V2 of the first section and the level of the second offset voltage V2 of the second section may be different from each other. For example, a rate of the pixels that receive the data with low grayscale value in the first section may be higher than a rate of the pixels that receive the data with low grayscale value in the second section. Accordingly, the level of the second offset voltage V2 of the first section may be higher than the level of the second offset voltage V2 of the second section. In other words, the forward bias applied to both ends of the light emitting element OLED (refer to FIG. 2) in the first section may be stronger than that in the second section. As a result, the first frame response speed may be improved in the first section in which the rate of the pixels that receive the data with low grayscale value is relatively high.

The image data RGB of the first section correspond to the image determined by the black image detecting unit 214 as having the dense area rate, of the area in which the pixels displaying the black data are arranged with respect to the entire display area, that is less than or equal to the reference rate. In other words, when the forward bias is applied to both ends of the light emitting element OLED (refer to FIG. 2) while the image corresponding to the first section is displayed, the first frame response speed may be improved, and the phenomenon in which the image looks brighter than the desired brightness in the light emitting element OLED, applied with the black data, may be prevented from occurring. Therefore, the display characteristics of the display device 1000 (refer to FIG. 1) may be improved.

Figure 6A:
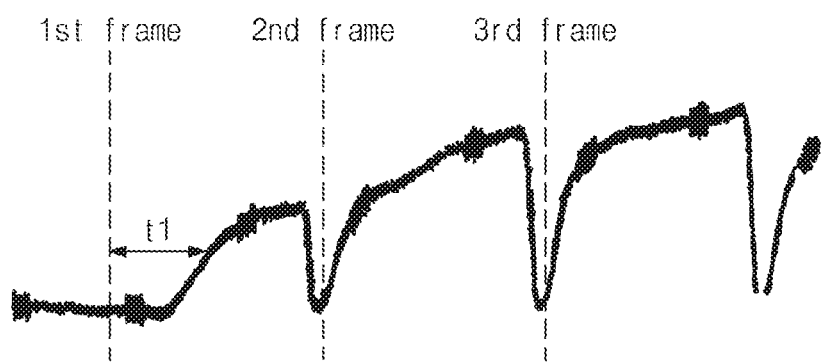
FIG. 6A is a graph showing a light amount of an image displayed by a display panel according to a comparison example.

FIG. 6A is a graph showing a light amount of an image displayed by a display panel according to a comparison example.

The display panel according to the comparison example may receive the second initialization voltage having a fixed level. When the level of the second initialization voltage is fixed, the level of the second initialization voltage may be set to have a value at which the light emitting element does not emit the light when the black image is displayed. As an example, a difference between the second initialization voltage and the second reference voltage may be set not to exceed the cut-in voltage of the light emitting element. When the difference between the second initialization voltage and the second reference voltage exceeds the cut-in voltage, the light emitting element may emit the light.

According to the comparison example, since the second initialization voltage is set not to allow the light emitting element to emit the light even though the light emitting element is required to emit the light, the response speed in the first frame "1st frame" may be slowed down. In the comparison example, a time t1 from a start time point of the first frame "1st frame" to a time point at which the light amount reaches about 50% of a maximum light amount of the first frame "1st frame" may be about 8.4 ms.

Figure 6B:
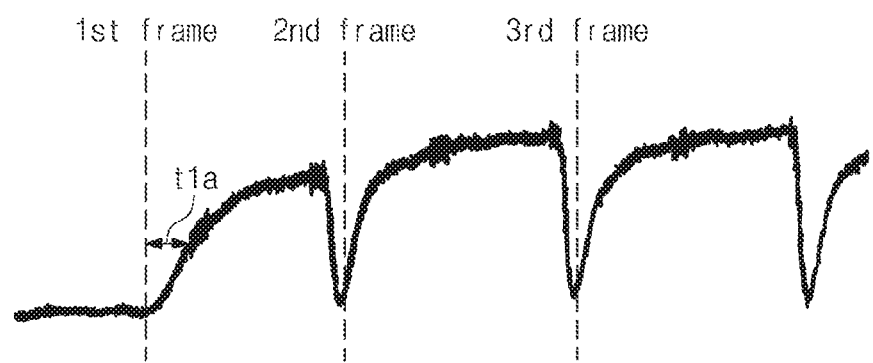
FIG. 6B is a graph showing a light amount of an image displayed by a display panel according to an exemplary embodiment of the inventive concept.

FIG. 6B is a graph showing a light amount of an image displayed by a display panel according to an exemplary embodiment of the inventive concept.

According to FIG. 6B, the display panel 100 (refer to FIG. 1) may receive the second initialization voltage Vint2 (refer to FIG. 1) of which the voltage level is adaptively changed depending on the image type. For example, when the dense area rate, of the area in which the pixels displaying the black data are arranged with respect to the entire display area, is greater than the reference rate, the second initialization voltage Vint2 may have the voltage level that prevents the light emitting element OLED from emitting the light. As an example, the difference between the second initialization voltage Vint2 and the second reference voltage ELVSS (refer to FIG. 1) may be set not to exceed the cut-in voltage of the light emitting element OLED.

In addition, when the dense area rate is less than or equal to the reference rate, the second initialization voltage Vint2 may be set to have the level higher than that of the second reference voltage ELVSS. In this case, the forward bias may be applied to the light emitting element OLED. The difference between the second initialization voltage Vint2 and the second reference voltage ELVSS may be greater than zero. For example, the difference between the second initialization voltage Vint2 and the second reference voltage ELVSS may be greater than the cut-in voltage of the light emitting element OLED.

The graph shown in FIG. 6B shows the light amount of the image displayed by the display panel 100, which is measured under a condition that the dense area rate is less than or equal to the reference rate. According to the present exemplary embodiment, since the forward bias is applied to the light emitting element OLED by the second initialization voltage Vint2 under this condition, the response speed of the first frame "1st frame" may be improved. A time t1a from a start time point of the first frame "1st frame" to a time point at which the light amount reaches about 50% of a maximum light amount of the first frame "1st frame" may be about 4.7 ms. When compared with the comparison example described with reference to FIG. 6A, the response speed of the first frame may be improved by about 44%.

According to the above-described exemplary embodiments of the inventive concept, the initialization voltage may be determined by taking into account the image histogram for each grayscale of the image data or the image type according to the average-on pixel ratio of the image data. In other words, the initialization voltage may be adaptively determined depending on the image type. Accordingly, the initialization voltage may be controlled in accordance with the image type such that a phenomenon in which a black image looks brighter may be prevented, or the initialization voltage may be controlled such that the frame response speed may be improved. As a result, the display characteristics of the display device may be improved.

While the inventive concept has been shown and described with reference to exemplary embodiments thereof, it will be understood by those of ordinary skill in the art that various changes in form and detail may be made thereto without departing from the spirit and scope of the inventive concept as set forth by the following claims.

What is claimed is:

1. A display device comprising:
a display panel comprising pixels each comprising a light emitting element and a bypass transistor connected to the light emitting element to receive an initialization voltage;
a first offset voltage determining unit configured to determine a first offset voltage using a brightness period of image data and a temperature of the display panel;
a black image detecting unit configured to detect black data among the image data to determine a dense area of the pixels to which the black data are applied, and determine whether to proceed with a subsequent operation that analyzes the image data;
an image analyzing unit configured to analyze the image data depending on the determination of whether to proceed with the subsequent operation, and output an analyzed result; and
a second offset voltage determining unit configured to determine a second offset voltage using the analyzed result of the image analyzing unit,
wherein the initialization voltage is determined using the first offset voltage and the second offset voltage.

2. The display device of claim 1, wherein the image analyzing unit is an image histogram analyzing unit that analyzes an image histogram for each grayscale of the image data, and the image histogram analyzing unit outputs a histogram analysis result of the image data to the second offset voltage determining unit.

3. The display device of claim 2, wherein the second offset voltage determining unit determines an image type of the image data using the histogram analysis result and determines the second offset voltage using the image type.

4. The display device of claim 3, wherein the image data comprise one or more color components,
the second offset voltage determining unit determines the second offset voltage using the one or more color components,
the image type is a first image type or a second image type,
the image data having the second image type has more green color components than the image data have the first image type, and
a level of the second offset voltage when the image type is the second image type is higher than a level of the second offset voltage when the image type is the first image type.

5. The display device of claim 3, wherein the image type is a first image type or a second image type,
a low grayscale data frequency of the first image type is higher than a low grayscale data frequency of the second image type, and
a level of the second offset voltage when the image type is the first image type is higher than a level of the second offset voltage when the image type is the second image type.

6. The display device of claim 1, wherein the image analyzing unit is an average on-pixel ratio determining unit that determines an average on-pixel ratio of the image data, and the average on-pixel ratio determining unit outputs a signal comprising average on-pixel ratio information of the image data to the second offset voltage determining unit.

7. The display device of claim 6, wherein the second offset voltage determining unit determines which section among plural on-pixel ratio sections the average on-pixel ratio information belongs to and determines the second offset voltage depending on the section.

8. The display device of claim 7, wherein the plural on-pixel ratio sections comprise a first section and a second section having an average on-pixel ratio higher than an average on-pixel ratio of the first section, and
a level of the second offset voltage corresponding to the first section is higher than a level of the second offset voltage corresponding to the second section.

9. The display device of claim 1, wherein the light emitting element comprises an anode electrode and a cathode electrode, the bypass transistor is connected to the anode electrode, and the cathode electrode is configured to receive a reference voltage.

10. The display device of claim 9, further comprising an adding unit configured to add the reference voltage, the first offset voltage, and the second offset voltage to one another to output a preliminary initialization voltage.

11. The display device of claim 10, further comprising a fade in/out controlling unit that receives a first preliminary initialization voltage of an N-th frame and a second preliminary initialization voltage of an (N+1)th frame, which are output from the adding unit, and outputs the initialization voltage having a voltage level between the first preliminary initialization voltage and the second preliminary initialization voltage.

12. The display device of claim 1, wherein the black image detecting unit determines to proceed with the subsequent operation when the dense area of the pixels to which the black data are applied is less than or equal to a predetermined percent with respect to an entire display area, and
the image analyzing unit analyzes the image data only when the dense area of the pixels to which the black data are applied is less than or equal to the predetermined percent with respect to the entire display area.

13. The display device of claim 1, wherein the second offset voltage is about 0 volts when the dense area of the pixels to which the black data are applied is greater than a predetermined percent with respect to an entire display area.

14. A method of driving a display device comprising pixels each comprising a light emitting element and a bypass transistor, wherein the light emitting element comprises an anode electrode and a cathode electrode configured to receive a reference voltage, and the bypass transistor is configured to apply an initialization voltage to the anode electrode, the method comprising:
determining a first offset voltage using a brightness period of image data and a temperature of a display panel;
analyzing a grayscale of the image data to determine an image type of an image;
determining a second offset voltage using the image type of the image; and
adding the reference voltage, the first offset voltage, and the second offset voltage to one another to determine the initialization voltage.

15. The method of claim 14, wherein the determining of the image type comprises:
detecting black data among the image data; and
determining a dense area of the pixels to which the black data are applied, and
wherein the image type is determined when the dense area of the pixels to which the black data are applied is less than or equal to a predetermined percent with respect to an entire display area.

16. The method of claim 15, wherein, when the dense area of the pixels to which the black data are applied is greater than the predetermined percent with respect to the entire display area, a sum of the first offset voltage and the second offset voltage is set to be less than or equal to a cut-in voltage of the light emitting element.

17. The method of claim 15, wherein, when the dense area of the pixels to which the black data are applied is greater than the predetermined percent with respect to the entire display area, the second offset voltage is set to about 0 volts.

18. The method of claim 14, wherein the determining of the image type comprises analyzing an image histogram for each grayscale of the image data.

19. The method of claim 14, wherein the determining of the image type comprises determining an average on-pixel ratio of the image data.

20. A display device comprising:
a display panel comprising a pixel, wherein the pixel comprises a light emitting element and a bypass transistor connected to the light emitting element and configured to receive an initialization voltage;
a first offset voltage determining unit configured to determine a first offset voltage using a brightness period of image data and a temperature of the display panel; and
a second offset voltage determining unit configured to determine a second offset voltage depending on an image type according to an image histogram for each grayscale of the image data or to an average on-pixel ratio of the image data,
wherein the initialization voltage is determined using the first offset voltage and the second offset voltage.

* * * * *